United States Patent

Treuner et al.

[11] 3,919,205
[45] Nov. 11, 1975

[54] DITHIOCARBONYLTHIOACETYL CEPHALOSPORIN DERIVATIVES

[75] Inventors: Uwe D. Treuner; Hermann Breuer, both of Regensburg, Germany

[73] Assignee: E. R. Squibb & Sons, Inc., Princeton, N.J.

[22] Filed: June 11, 1973

[21] Appl. No.: 368,801

Related U.S. Application Data

[63] Continuation-in-part of Ser. No. 272,228, July 17, 1972, Pat. No. 3,846,418, which is a continuation-in-part of Ser. No. 180,523, Sept. 14, 1971, abandoned.

[52] U.S. Cl. .......................... 260/243 C; 424/246
[51] Int. Cl.² ....................... C07D 501/24
[58] Field of Search ................. 260/243 C

[56] References Cited
UNITED STATES PATENTS
3,574,190  4/1971  Honkanen.................. 260/239.1

*Primary Examiner*—Nicholas S. Rizzo
*Attorney, Agent, or Firm*—Lawrence S. Levinson; Merle J. Smith

[57] ABSTRACT

Dithiocarbonylthioacetylcephalosporin derivatives of the formula

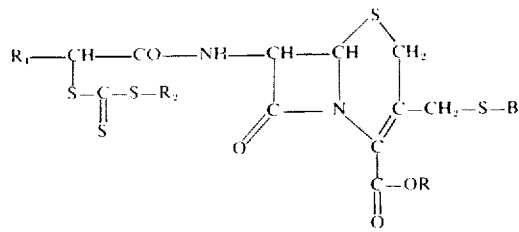

wherein R is hydrogen, lower alkyl, phenyl-lower alkyl, tri(lower alkyl)silyl, a salt forming ion, or the group

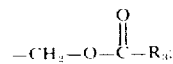

$R_1$ is hydrogen, lower alkyl, cyclo-lower alkyl, cyclo-lower alkenyl, cyclo-lower alkadienyl, phenyl, phenyl-lower alkyl, or certain heterocyclic groups; $R_2$ is lower alkyl, cyclo-lower alkyl, phenyl or phenyl-lower alkyl; $R_3$ is lower alkyl, phenyl or phenyl-lower alkyl; and B is lower alkyl or certain 5- or 6- membered heterocyclics in which nitrogen, oxygen and/or sulfur are the hetero atoms, are new and improved antibacterial agents.

14 Claims, No Drawings

DITHIOCARBONYLTHIOACETYL CEPHALOSPORIN DERIVATIVES

This application is a continuation-in-part of application Ser. No. 272,228, filed July 17, 1972, now U.S. Pat. No. 3,846,418, Nov. 5, 1974, which is in turn a continuation-in-part of application Ser. No. 180,523, filed Sept. 14, 1971, now abandoned.

SUMMARY OF THE INVENTION

This invention relates to new dithiocarbonylthioacetylcephalosporin derivatives of the formula (I)

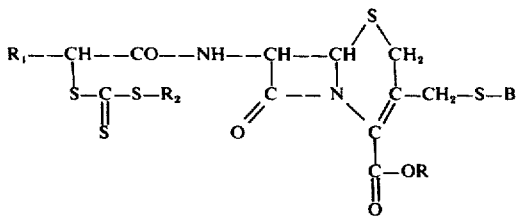

R represents hydrogen, lower alkyl, phenyl-lower alkyl, tri(lower alkyl)silyl, a salt forming ion of the group aluminum, alkali metal, alkaline earth metal or amine salt of the group lower alkylamine, phenyl-lower alkylamine or N-lower alkylpiperdine, or the group

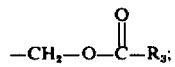

$R_1$ represents hydrogen, lower alkyl, cyclo-lower alkyl, cyclo-lower alkenyl, cyclo-lower alkadienyl, phenyl, phenyl-lower alkyl or one of the heterocyclics, thienyl, furyl, oxazolyl, isoxazolyl, pyridyl or thiazolyl; $R_2$ represents lower alkyl, cyclo-lower alkyl, phenyl or phenyl-lower alkyl; $R_3$ represents lower alkyl, phenyl or phenyl-lower alkyl; B is lower alkyl or one of the heterocyclics thiazole, isothiazole, oxazole, isoxazole, thiadiazole, thiatriazole, thiophene, tetrazole, pyridine including pyridine N-oxide, pyrimidine or triazine and the lower alkyl- and hydroxymethyl-substituted members.

The preferred members within each group are as follows: R is hydrogen, alkali metal, trimethylsilyl or

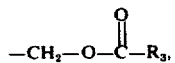

especially hydrogen, pivaloyloxymethyl, sodium or potassium; $R_1$ is hydrogen, lower alkyl, phenyl, thienyl, furyl, oxazolyl, isoxazolyl or thiazolyl, especially phenyl; $R_2$ is lower alkyl, especially methyl or ethyl; $R_3$ is lower alkyl, preferably methyl or t-butyl and B is a thiadiazole radical, particularly lower alkyl-1,3,4-thiadiazolyl, especially the 5-methyl-1,3,4-thiadiazol-2-yl and 3-methyl-1,2,4-thiadiazol-5-yl radical.

DETAILED DESCRIPTION OF THE INVENTION

In our copending parent application referred to above, we have disclosed a new group of cephalosporins having the structure in formula I above except that there is a different moiety in the 3-position of the 6-membered ring. It has now been found that an improved spectrum of activity is achieved when the 3-position bears a sulfur containing substituent having the configuration described above, i.e., the group $-CH_2-S-B$ is in this position.

The various groups represented by the symbols have the meanings defined below and these definitions are retained throughout this specification.

The lower alkyl groups are straight or branched hydro-carbon chains of up to seven carbon atoms, like methyl, ethyl, propyl, isopropyl, butyl, isobutyl, t-butyl, etc. The one to four carbon members are preferred and especially methyl and ethyl.

The cycloaliphatic groups are the four to six carbon alicyclics cyclobutyl, cyclopentyl and cyclohexyl as well as the monounsaturated four to six carbon rings, cyclobutenyl, cyclopentenyl and cyclohexenyl and di-unsturated five to six carbon rings cyclopentadienyl and cyclohexadienyl. The five and six carbon rings are preferred in each series with the 1,4 -cyclohexadienyl group being especially preferred.

The heterocyclic groups represented by $R_1$ are 5- to 6-membered monocyclic heterocyclic radicals (exclusive of hydrogen), including thienyl, furyl, oxazolyl, isoxazolyl and thiazolyl, as well as these heterocyclics with the substituents halo, lower alkyl (particularly methyl and ethyl), lower alkoxy (particularly methoxy and ethoxy) or phenyl.

The salt forming ions represented by R are metal ions, e.g., aluminum, alkali metal ions such as sodium or potassium, alkaline earth metal ions such as calcium or magnesium, or an amine salt ion, of which a number are known for this purpose, for example, phenyl-lower alkylamines like dibenzylamine, N,N-dibenzylethylenediamine, lower alkylamines like methylamine, triethylamine and N-lower alkylpiperidines like N-ethylpiperidine.

The heterocycles represented by B are 5- or 6-membered heterocyclics containing sulfur, oxygen and/or sulfur or nitrogen as the hetero atom or atoms, i.e., thiazole, isothiazole, thiadiazole including the radicals 1,2,4-thiadiazol-5-yl, 1,2,4-thiazol-3-yl and 1,3,4-thiazol-2 -yl, oxazole, isoxazole, oxadiazole including 1,2,4-oxadiazol-3-yl and 1,3,4-oxadiazol-2-yl, triazole including 1,2,4-triazol-3-yl and 1,2,3-triazol-4-yl, thiatriazole including 1,2,3,4-thiatriazol-5-yl and 1,2,3,5-thiatriazol-4-yl, thiophene, tetrazole, pyridine including pyridine-N-oxide, pyrimidine, triazine including 1,2,4-triazin-3-yl and 1,3,5-triazin-2-yl as well as these heterocyclics containing a lower alkyl or hydroxymethyl substituent (especially of the six-membered rings).

The new dithiocarbonylthioacetylcephalosporin derivatives of this invention are produced in a manner similar to that described in parent application Ser. No. 272,228, by reacting 7-aminocephalosporanic acid (7-ACA) (or derivative wherein R is other than hydrogen) with a mercaptan HS-B at a pH of about 8–8.5 to obtain the derivative of the formula (III)

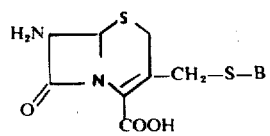

This is then acylated on the amino group with a dithiocarbonylthioacetic acid of the formula (IV)

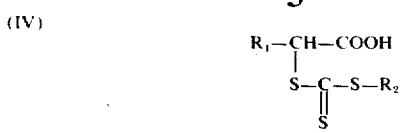

or an activated derivative of the former (II).

The activated derivatives referred to include, for example, the reaction product with an anhydride forming reagent such as ethyl chloroformate, benzoyl chloride, pivaloyl chloride, etc. or with bis-imidazolecarbonyl, dicyclohexylcarbodiimide, p-nitrophenol or the like.

The reactioin between the 7-aminocephalosporanic acid compound and the dithiocarbonylthioacetic acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoyl chloride or the like, or other activating compound such as dicyclohexylcarbodiimide, along with a salt forming organic base, such as triethylamine, pyridine or the like, followed, after an interval, by the addition of the 7-aminocephalosporanic acid compound. The product of the reaction is then isolated by conventional procedures, e.g., by concentration or evaporation of the solvent.

When R is the acyloxymethyl group

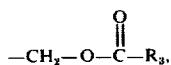

this group may be introduced into the 7-aminocephalosporanic acid moiety prior to the reaction with the dithiocarbonylthioacetic acid or the activated derivative by treatment with 1 to 2 moles of a halomethyl ester of the formula (V).

hal—CH$_2$OCOR$_3$ wherein hal is halogen, preferably chlorine or bromine, in an inert organic solvent such as dimethylformamide, acetone, dioxane, benzene or the like, at about ambient temperature or below.

As an alternative, a product of formula I may be produced by reacting the compound of formula III with an α-haloacid of the formula (VI)

to obtain the intermediate (VII)

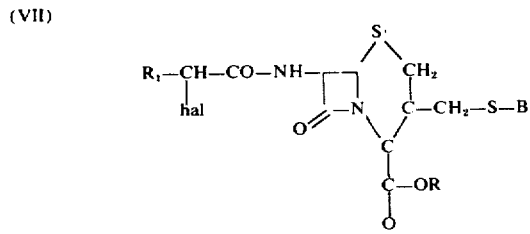

which is then treated with a salt such as the alkali metal salt and preferably the potassium salt of the trithio compound having the formula (VIII)

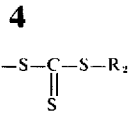

Me represents a metal, hal is halogen, preferably chlorine or bromine and R, R$_1$ and R$_2$ are the same as above.

The dithiocarbonylthioacetic acid of formula (IV) is produced as described in said parent application Ser. No. 272,228.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli, Streptococcus pyogenes* and especially resistant organisms like *Proteus rettgeri* and *E. hafniae*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 100 mg./kg., daily, orally or parenterally, in single or two to four divided doses to treat infections of bacterial origin, e.g., 2.5 to 5.0 mg./kg. in mice.

Oral forms give prompt high blood levels which are maintained for relatively long periods.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 0.5% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

A mixture of 13.6 g. (0.05 M) of 7-aminocephalosporanic acid in 100 ml. of water and 50 ml. of acetone are brought to pH 8 with sodium hydroxide while stirring. 9.8 g. (0.57 M) of 2-methyl-1,3,4-thiadiazole-5-thiol are added and the mixture is heated at 80° for 4 hours. After cooling to 5°, this is acidified to pH 3.5 with dilute hydrochloric acid and stirred for 15 minutes. The precipitated solid is filtered under suction and washed with acetone. This 3-[[(5-methyl-1,3,4-thiadiazol-2-yl)thio]methyl]-7-amino-8-oxo-5-thia-1-azabicyclo[4.2.0]oct-2-ene-2-carboxylic acid is purified by dissolving in sodium bicarbonate solution and reprecipitating with 2N hydrochloric acid; yield 12.7 g., m.p. 206°.

EXAMPLE 2

3.4 g. (0.01M) of 3-[[(5-methyl-1,3,4-thiadiazol-2-yl)-thio]methyl]-7-amino-8-oxo-5-thia-1-azabicyclo[4.2.0]oct-2-ene-2-carboxylic acid are dissolved in 150 ml. of 2% sodium bicarbonate solution. 100 ml. of acetone are added and this is cooled to 0°. 3.0 g. (0.012M) of (α-bromo)-phenacetyl bromide in 10 ml. of acetone are added dropwise and the mixture is stirred for 4 hours. After removing the acetone under vacuum at room temperature, the mixture is shaken with ether and the organic phase is separated, shaken with water and dried over sodium sulfate. 2.7 g. of white 7-(DL-2-bromo-2-phenylacetamido)-3-[[(5-methyl-1,3,4-thiadiazol-2-yl)thio]methyl]-8-oxo-5-thia-1-azabicyclo[4.2.0]-oct-2-ene-2-carboxylic acid are obtained, m.p. 105°.

EXAMPLE 3

1.1 g. (0.002M) of the product of Example 2 are dissolved in 15 ml. of dimethylformamide and 0.3 g. (0.002M) of potassium methyl trithionate in 5 ml. of dimethylformamide are added. The mixture is stirred at 5° for 10 minutes, poured into 200 ml. of water and extracted with 200 ml. of ethyl acetate. The organic phase is washed with water and dried over sodium sulfate. After evaporating the solvent, 0.6 g. of light yellow 3-[[(5-methyl-1,3,4-thiadiazol-2-yl)thio]methyl]-7-[DL-2-[[(methylthio)thiocarbonyl]thio]-2-phenylacetamido]-8-oxo-5-thia-1-azabicyclo-[4.2.0]oct-2-ene-2-carboxylic acid are obtained and recrystallized from carbon tetrachloride-chloroform, m.p. 110°.

EXAMPLE 4

By substituting 3-methyl-1,2,4-thiadiazole-5-thiol for the 2-methyl-1,3,4-thiadiazole-5-thiol in the procedure of Example 1, 11.6 g. of 3-[[(3-methyl-1,2,4,-thiadiazol-5-yl)thio]methyl]-7-amino-8-oxo-5-thia-1-azabicyclo[4.2.0]oct-2-ene-2-carboxylic acid, m.p. 186° (dec.) are obtained.

EXAMPLE 5

0.03M of (α-bromo)phenacetyl bromide and 0.03 M of 3-[[(3-methyl-1,2,4-thiadiazol-5-thio]methyl]-7-amino-8-oxo-5-thia-1-azabicyclo[4.2.0]oct-2-ene-2-carboxylic acid yield 6.8 g. of 7-(DL-2-bromo-2-phenylacetamido)-3-[[(3-methyl-1,2,4-thiadiazol-5-yl)thio]methyl]-8-oxo-5-thia-1-azabicyclo[4.2.0]oct-2-ene-2-carboxylic acid, m.p. 83°, by the procedure of Example 2.

EXAMPLE 6

0.01M of the product of Example 5 and 0.01M of potassium methyltrithionate in the procedure of Example 3 yield 0.3 g. of 3-[[3-methyl-1,2,4-thiadiazol-5-yl)thio]methyl]-7-[DL-2-[[(methylthio)thiocarbonyl]thio]-2-phenylacetamido]-8-oxo-5-thia-1-azabicyclo[4.2.-0]oct-2-ene-2-carboxylic acid (recrystallized from methylene chloride -chloroform), m.p. 138°. The following additional examples are obtained by the procedure of Examples 1 to 3, by substituting fof the 2-methyl-1,3,4-thiadiazole-5-thiol, the thiol indicated by the 3-substituent:

| Example | |
|---|---|
| 7 | 3-[[(1,3,4-thiazol-2-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 8 | 3-[[(1,3,4-oxadiazol-2-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 9 | 3-[[(5-ethyl-1,3,4-oxadiazol-2-yl)thio]methyl]-7-[DL-2-[[(methylthio)thiocarbonyl]thio]-2-phenyl-acetamido]-8-oxo-5-thia-1-azabicyclo[4.2.0]oct-2-ene-2-carboxylic acid. |
| 10 | 3-[[(1,2,4-triazol-3-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 11 | 3-[[(4-methyl-1,2,4-triazol-3-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 12 | 3-[[(1,2,3-triazol-5-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 13 | 3-[[(1-methyl-1,2,3-triazol-5-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 14 | 3-[[(1,2,3,4-tetrazol-5-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 15 | 3-[[(1-ethyl-1,2,3,4-tetrazol-5-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 16 | 3-[[(1,2,3,4-thiatriazol-5-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 17 | 3-[[(2-methylthiazol-5-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 18 | 3-[[(3-isothiazolyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 19 | 3-[[(3-isoxazolyl)thio]methyl]-7-[DL-2-[[methylthio)-thiocarbonyl]thio]-2-phenylacetamido]-8-oxo-5-thia-1-azabicyclo[4.2.0]oct-2-ene-2-carboxylic acid. |
| 20 | 3-[[(5-methyl-3-isoxazolyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 21 | 3-[[(1,2,4-thiadiazol-5-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 22 | 3-[[(1,2,4-thiadiazol-3-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 23 | 3-[[(5-butyl-1,2,4-thiadiazol-3-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 24 | 3-[[(2-thienyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 25 | 3-[[(4-methyl-3-thienyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 26 | 3-[[(2-oxazolyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 27 | 3-[[(3-methyl-2-oxazolyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 28 | 3-[[(3-methyl-1,2,4-oxadiazol-5-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 29 | 3-[[(2-pyridyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 30 | 3-[[(5-methyl-2-pyridyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 31 | 3-[[(2-ethyl-4-pyridyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 32 | 3-[[(2-pyrazinyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 33 | 3-[[(5-pyrimidinyl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 34 | 3-[[(1,2,4-triazin-3-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 35 | 3-[[(5-methyl-1,2,4-triazin-3-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |
| 36 | 3-[[(1,3,5-triazin-2-yl)thio]methyl]-7-[DL-2-[[(methylthio)thiocarbonyl]thio]-2-phenylacetamido]-8-oxo-5-thia-1-azabicyclo[4.2.0]oct-2-ene-2-carboxylic acid. |

The following additional products are obtained by the procedure of Example 3:

| Example | |
|---|---|
| 37 | 3-[[(5-methyl-1,3,4-thiadiazol-2-yl)thio]methyl]-7-[2-[[(ethylthio)thiocarbonyl]thio]-2-phenylacetamido]-8-oxo-5-thia-1-azabicyclo[4.2.0]oct-2-ene-2-carboxylic acid and potassium salt. |
| 38 | 3-[[(1,3,4-oxadiazol-2-yl)thio]methyl]-7-[2-[(cyclohexylthio)thiocarbonyl]thio]-2-phenylacetamido]-8-oxo-5-thia-1-azabicyclo[4.2.0]oct-2-ene-2-carboxylic acid and sodium salt. |
| 39 | 3-[[(5-ethyl-1,3,4-oxadiazol-2-yl)thio]methyl]-7-[2-[(ethylthio)thiocarbonyl]thioacetamido]-8-oxo-5-thia-1-azabicyclo[4.2.0]oct-2-ene-2-carboxylic acid. |
| 40 | 3-[[(1,2,3-triazol-5-yl)thio]methyl]-7-[2-[(n-butylthio)thiocarbonyl]thioacetamido]-8-oxo-5-thia-1-azabicyclo[4.2.0]oct-2-ene-2-carboxylic acid. |
| 41 | 3-[[(2-methylthiazol-5-yl)thio]methyl]-7-[2-[(cyclohexylthio)thiocarbonyl]thioacetamido]-8-oxo-5-thia-1-azabicyclo[4.2.0]oct-2-ene-2-carboxylic acid triethylamine salt. |
| 42 | 3-[[(1,2,4-thiadiazol-3-yl)thio]methyl]-7-[2-[(methylthio)thiocarbonyl]thioacetamido]-8-oxo-5-thia-1-azabicyclo[4.2.0]oct-2-ene-2-carboxylic acid pivaloyloxymethyl ester. |
| 43 | 3-[[(5-propyl-2-pyridyl)thio]methyl]-7-[2-[(benzylthio)thiocarbonyl]thioacetamido]-8-oxo-5-thia-1-azabicyclo[4.2.0]oct-2-ene-2-carboxylic acid. |
| 44 | 3-[[(1,3,5-triazin-2-yl)thio]methyl]-7-[2-[[(benzylthio)thiocarbonyl]thio]-2-phenylacetamido]-8-oxo-5-thia-1-azabicyclo[4.2.0]oct-2-ene-2-carboxylic acid. |

The following additional products having the formula (c) in the table are obtained by the procedure of Example 3 by substituting for the 7-(DL-2-bromo-2-phenylacetamido)-3-[[(5-methyl-1,3,4-thiadiazol-2-yl)thio]methyl]-8-oxo-5-thia-1-azabicyclo[4.2.0]oct-2-ene-2-carboxylic acid, the starting material (a), and for the potassium methyl-trithionate, the starting material (b) with the substituents indicated in the table:

TABLE

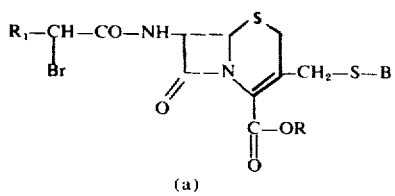 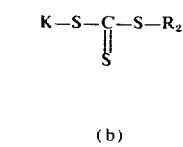 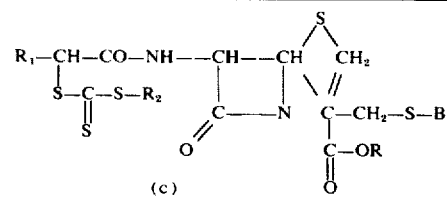

(a)     (b)     (c)

| Example | R | $R_1$ | $R_2$ | B |
|---|---|---|---|---|
| 45 | $CH_3$ | H | $CH_3$ | N=N, S, —CH$_3$ (5-methyl-1,3,4-thiadiazol-2-yl) |
| 46 | $C_2H_5$ | $CH_3$ | $C_2H_5$ | N=N, S, —C(CH$_3$)$_3$ (5-tert-butyl-1,3,4-thiadiazol-2-yl) |
| 47 | $CH_3$ | $C_3H_7$ | $C_2H_5$ | thiazolyl |
| 48 | —CH$_2$OC(O)—CH(CH$_3$)$_2$ | $C_6H_5CH_2$— | $C_6H_5CH_2$— | N—N, O (1,3,4-oxadiazol-2-yl) |
| 49 | —CH$_2$OC(O)—C$_6$H$_5$ | $C_6H_5$ | H | N—N, NH, CH$_3$ (5-methyl-1H-1,2,4-triazol-3-yl) |
| 50 | $C_2H_5$ | $C_6H_5$ | $C_2H_5$ | N-methylpyrazolyl |
| 51 | $C_2H_5$ | thienyl | $C_2H_5$ | thiazolyl |
| 52 | $C_6H_5CH_2$— | furyl | $C_6H_5CH_2$— | oxadiazolyl |

TABLE-continued
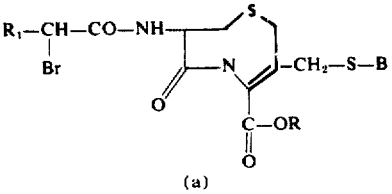
(a)
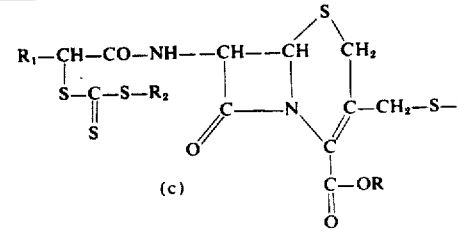
(b)
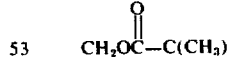
(c)
| Example | R | R₁ | R₂ | B |
|---|---|---|---|---|
| 53 | CH₂OC(=O)C(CH₃)₃ | C₆H₅ | C₆H₅ |  |
| 54 | Si(CH₃)₃ | 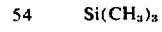 | n—butyl |  |
| 55 | H | 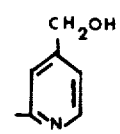 |  |  |
| 56 | H |  | C₂H₅ |  |
| 57 | K | 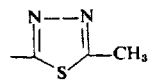 | CH₃ |  |
| 58 | K |  | C₆H₅ |  |
| 59 | H |  | C₂H₅ |  |
| 60 | H |  |  |  |
| 61 | H |  | CH₃ |  |
| 62 | H |  | CH₃ | CH₃ |
| 63 | Na |  | C₂H₅ | C₂H₅ |
| 64 | H | C₂H₅ | CH₃ |  |
| 65 | H | 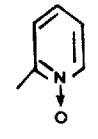 | CH₃ | CH₃ |

What is claimed is:
1. A compound of the formula

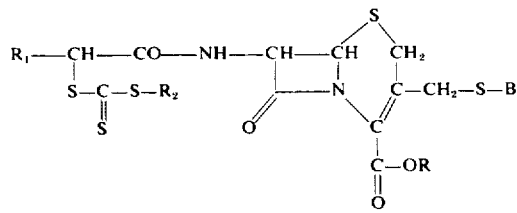

wherein R is hydrogen, lower alkyl, phenyl-lower alkyl, tri(lower alkyl)silyl,

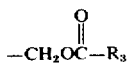

or a salt forming ion of the group consisting of aluminum, alkali metal, alkaline earth metal, lower alkylamine, phenyl-lower alkylamine or N-lower alkylpiperidine; $R_1$ is phenyl, pyridyl, thienyl or furyl; $R_2$ and $R_3$ each is lower alkyl, phenyl or phenyl-lower alkyl; and B is a heterocyclic of the group consisting of thiazole, isothiazole, thiazole, oxazole, isoxazole, oxadiazole, triazole, thiatriazole, tetrazole and said heterocyclics bearing a lower alkyl group.

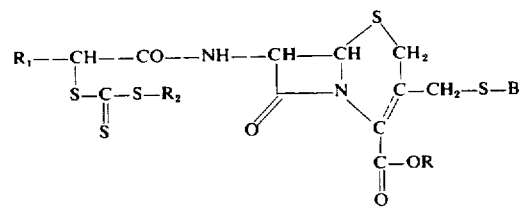

wherein R is hydrogen, alkali metal, trimethylsilyl or

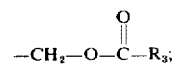

$R_1$ is phenyl, thienyl or furyl; $R_2$ is lower alkyl and B is thiadiazole or (lower alkyl)-thiadiazole.

3. A compound as in claim 1 wherein $R_1$ is phenyl.
4. A compound as in claim 3 wherein $R_2$ is lower alkyl.
5. A compound as in claim 3 wherein R is alkali metal ion and $R_2$ is lower alkyl.
6. A compound as in claim 2 wherein B is 5-lower alkyl-1,3,4-thiadiazol-2-yl.
7. A compound as in claim 6 wherein the lower alkyl group is methyl.
8. The compound as in claim 2 wherein R is hydrogen, $R_1$ is phenyl, $R_2$ is methyl and B is 5-methyl-1,3,4-thiadiazol-2-yl.
9. A compound as in claim 2 wherein B is 3-lower alkyl-1,2,4-thiadiazol-5-yl.
10. A compound as in claim 9 wherein the lower alkyl group is methyl.
11. The compound as in claim 2 wherein R is hydrogen, $R_1$ is phenyl, $R_2$ is methyl and B is 3-methyl-1,2,4-thiadiazol-5-yl.
12. A compound as in claim 1 wherein B is tetrazole.
13. A compound as in claim 1 wherein B is (lower alkyl)tetrazole.
14. A compound as in claim 3 wherein B is (lower alkyl)tetrazole and $R_2$ and $R_3$ each is lower alkyl.

* * * * *

UNITED STATES PATENT OFFICE
CERTIFICATE OF CORRECTION

PATENT NO. : 3,919,205
DATED : November 11, 1975
INVENTOR(S) : Uwe D. Treuner, Hermann Breuer It is certified that error appears in the above-identified patent and that said Letters Patent are hereby corrected as shown below:

Column 3, formula VII that portion of the formula reading

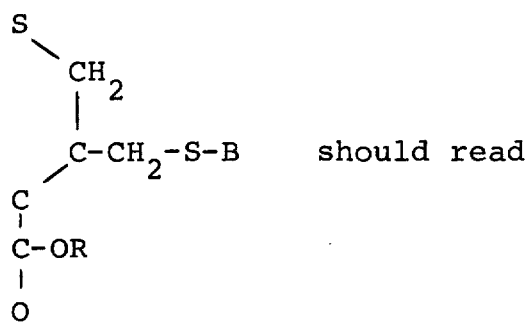 should read 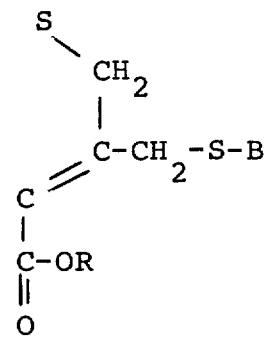

In the Table - formula (c) that portion of the formula reading

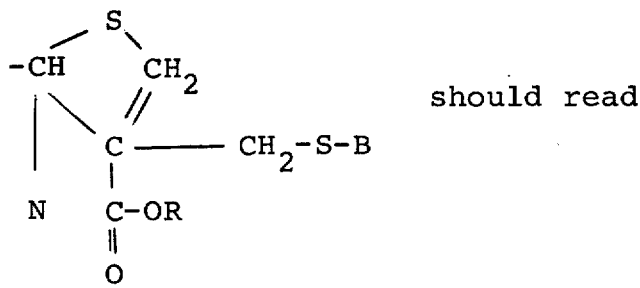 should read 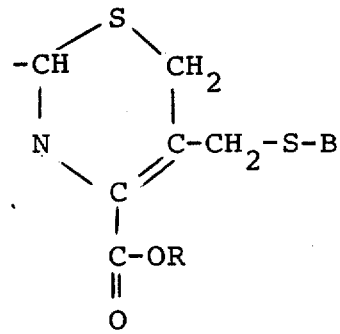

Column 11, line 22 "thiazole" should read -- thiadiazole --
Column 11, line 25 before the formula should be inserted
-- 2. A compound of the formula --

Signed and Sealed this

Thirtieth Day of November 1976

[SEAL]

Attest:

RUTH C. MASON
Attesting Officer

C. MARSHALL DANN
Commissioner of Patents and Trademarks